US012437620B2

(12) United States Patent
Ewing et al.

(10) Patent No.: US 12,437,620 B2
(45) **Date of Patent: *Oct. 7, 2025**

(54) ANTI-THEFT RETAIL MERCHANDISE HOOK WITH RADIO TRANSMISSION

(71) Applicant: Fasteners for Retail, Inc., Twinsburg, OH (US)

(72) Inventors: Brent O. Ewing, Roscoe, IL (US); Chan Chor Man, Tai Po N.T. (HK)

(73) Assignee: Fasteners for Retail, Inc., Twinsburg, OH (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/639,200

(22) Filed: Apr. 18, 2024

(65) Prior Publication Data

US 2024/0265793 A1 Aug. 8, 2024

Related U.S. Application Data

(63) Continuation of application No. 18/299,334, filed on Apr. 12, 2023, now Pat. No. 11,990,013, which is a (Continued)

(51) Int. Cl.

*G08B 13/24* (2006.01)
*G08B 13/14* (2006.01)

(Continued)

(52) U.S. Cl.

CPC ..... *G08B 13/2434* (2013.01); *G08B 13/1436* (2013.01); *G08B 13/1472* (2013.01);

(Continued)

(58) Field of Classification Search

CPC ............ G08B 13/2434; G08B 13/1436; G08B 13/1472; G08B 13/1481; G08B 13/149;

(Continued)

(56) References Cited

U.S. PATENT DOCUMENTS 4,383,242 A 5/1983 Sassover et al.
4,718,626 A 1/1988 Thalenfeld et al.

(Continued)

FOREIGN PATENT DOCUMENTS

KR 100823026 B1 4/2008
KR 20100137956 A 12/2010

(Continued)

OTHER PUBLICATIONS

Indyme Smartresponse; 2 pages printed from internet http://www.indyme.com/; date last visited Apr. 8, 2013.

*Primary Examiner* — Omeed Alizada

(74) *Attorney, Agent, or Firm* — Reinhart Boerner Van Deuren P.C.

(57) ABSTRACT

A signal-emitting retail display device that includes a wire having a top portion and a bottom portion, the top portion configured to support a label holder, the bottom portion configured to store one or more retail items. The signal-emitting retail display device also has an electronic unit that includes an emitter. The emitter is configured to emit a warning signal, and configured to transmit a wireless signal to an alarm box, where the wireless signal is indicative of the warning signal. The wire is electrically coupled to the electronic unit such that the wire functions as an antenna for the transmission of the wireless signal to the alarm box.

15 Claims, 11 Drawing Sheets

Related U.S. Application Data continuation of application No. 17/675,757, filed on Feb. 18, 2022, now Pat. No. 11,663,893, which is a continuation of application No. 17/221,476, filed on Apr. 2, 2021, now Pat. No. 11,295,591, which is a continuation of application No. 16/899,345, filed on Jun. 11, 2020, now Pat. No. 10,997,839, which is a continuation of application No. 16/113,796, filed on Aug. 27, 2018, now Pat. No. 10,720,035, which is a continuation of application No. 15/627,033, filed on Jun. 19, 2017, now Pat. No. 10,121,341.

(60) Provisional application No. 62/449,465, filed on Jan. 23, 2017.

(51) Int. Cl.
*G08B 25/00* (2006.01)
*G08B 25/10* (2006.01)

(52) U.S. Cl.
CPC ....... *G08B 13/1481* (2013.01); *G08B 13/149* (2013.01); *G08B 25/009* (2013.01); *G08B 25/10* (2013.01); *G08B 25/007* (2013.01)

(58) Field of Classification Search
CPC .... G08B 25/009; G08B 25/10; G08B 25/007; A47F 5/0861
See application file for complete search history.

(56) References Cited

U.S. PATENT DOCUMENTS

| | | | |
|---|---|---|---|
| 5,068,643 | A | 11/1991 | Yashina |
| 5,168,263 | A | 12/1992 | Drucker |
| 5,317,304 | A | 5/1994 | Choi |
| 5,434,559 | A | 7/1995 | Smiley et al. |
| 5,570,080 | A | 10/1996 | Inoue et al. |
| 5,757,270 | A | 5/1998 | Mori |
| 5,838,225 | A | 11/1998 | Todd |
| 5,979,674 | A | 11/1999 | Thalenfeld |
| 5,995,003 | A | 11/1999 | Rogers |
| 5,995,951 | A | 11/1999 | Ferguson |
| 6,049,268 | A | 4/2000 | Flick |
| 6,133,830 | A | 10/2000 | D'Angelo et al. |
| 6,279,256 | B1 | 8/2001 | Norolof et al. |
| 6,373,381 | B2 | 4/2002 | Wu |
| 6,517,000 | B1 | 2/2003 | McAllister et al. |
| 6,690,411 | B2 | 2/2004 | Naidoo et al. |
| 6,967,578 | B1 | 11/2005 | Guida |
| 7,059,518 | B2 | 6/2006 | Forster |
| 7,202,784 | B1 | 4/2007 | Herwig |
| 7,530,188 | B2 | 5/2009 | Beilenhoff et al. |
| 7,584,930 | B2 | 9/2009 | Zich |
| 7,591,422 | B2 | 9/2009 | Maitin |
| 7,671,741 | B2 | 3/2010 | Lax et al. |
| 7,768,399 | B2 | 8/2010 | Hachmann et al. |
| 7,969,305 | B2 | 6/2011 | Belden, Jr. et al. |
| 8,274,391 | B2 | 9/2012 | Yang |
| 8,378,826 | B2 | 2/2013 | Mercier et al. |
| 8,534,469 | B2 | 9/2013 | Northrup, Jr. et al. |
| 8,629,772 | B2 | 1/2014 | Valiulis et al. |
| 8,720,702 | B2 | 5/2014 | Nagel |
| 8,803,687 | B2 | 8/2014 | Valiulis et al. |
| 8,830,687 | B2 | 9/2014 | Snider et al. |
| 8,884,761 | B2 | 11/2014 | Valiulis |
| 9,241,583 | B2 | 1/2016 | Nagel |
| 9,254,049 | B2 | 2/2016 | Nagel |
| 9,318,007 | B2 | 4/2016 | Valiulis et al. |
| 9,318,008 | B2 | 4/2016 | Valiulis et al. |
| 9,324,220 | B2 | 4/2016 | Valiulis |
| 10,121,341 | B2 | 11/2018 | Ewing et al. |
| 10,720,035 | B2 | 7/2020 | Ewing et al. |
| 10,885,753 | B2 | 1/2021 | Ewing et al. |
| 10,993,550 | B2 | 5/2021 | Ewing et al. |
| 10,997,839 | B2 | 5/2021 | Ewing et al. |
| 11,295,591 | B2 | 4/2022 | Ewing et al. |
| 11,990,013 | B2 | 5/2024 | Ewing et al. |
| 2002/0067259 | A1 | 6/2002 | Fufidio et al. |
| 2002/0130776 | A1 | 9/2002 | Houde |
| 2003/0030548 | A1 | 2/2003 | Kovacs et al. |
| 2003/0175004 | A1 | 9/2003 | Garito et al. |
| 2003/0227382 | A1 | 12/2003 | Breed |
| 2004/0145477 | A1 | 7/2004 | Easter et al. |
| 2004/0195319 | A1* | 10/2004 | Forster ............... G06K 7/10346 235/451 |
| 2005/0104733 | A1 | 5/2005 | Campero |
| 2005/0161420 | A1 | 7/2005 | Hardy et al. |
| 2006/0198611 | A1 | 9/2006 | Park |
| 2008/0204239 | A1 | 8/2008 | Marszalek et al. |
| 2008/0307687 | A1 | 12/2008 | Nagel et al. |
| 2008/0309489 | A1 | 12/2008 | Hachmann et al. |
| 2009/0091448 | A1 | 4/2009 | Leyden et al. |
| 2009/0095695 | A1 | 4/2009 | Moock et al. |
| 2009/0109027 | A1 | 4/2009 | Schuller |
| 2010/0097223 | A1 | 4/2010 | Kruest et al. |
| 2010/0175438 | A1 | 7/2010 | Sankey |
| 2010/0238031 | A1 | 9/2010 | Belden, Jr. et al. |
| 2011/0215060 | A1 | 9/2011 | Niederhuefner |
| 2011/0227735 | A1 | 9/2011 | Fawcett et al. |
| 2012/0293330 | A1 | 11/2012 | Grant et al. |
| 2013/0141240 | A1 | 6/2013 | Valiulis et al. |
| 2013/0142494 | A1 | 6/2013 | Valiulis et al. |
| 2014/0055264 | A1 | 2/2014 | Valiulis et al. |
| 2014/0055266 | A1 | 2/2014 | Valiulis et al. |
| 2014/0070948 | A1 | 3/2014 | Valiulis et al. |
| 2014/0197953 | A1* | 7/2014 | Valiulis ................. A47F 5/0861 340/568.8 |
| 2014/0352372 | A1 | 12/2014 | Grant et al. |
| 2022/0172588 | A1 | 6/2022 | Ewing et al. |

FOREIGN PATENT DOCUMENTS

| | | | |
|---|---|---|---|
| KR | 2020110002261 | U | 3/2011 |
| KR | 20110043837 | A | 4/2011 |
| KR | 20110080411 | A | 7/2011 |
| WO | 9740724 | A1 | 11/1997 |
| WO | 9927824 | A1 | 6/1999 |
| WO | 0181988 | A2 | 11/2001 |
| WO | 2011025085 | A1 | 3/2011 |
| WO | 2014149834 | A1 | 9/2014 |
| WO | 2015/142729 | A1 | 9/2015 |
| WO | 2016/077597 | A1 | 5/2016 |

* cited by examiner

ANTI-THEFT RETAIL MERCHANDISE HOOK WITH RADIO TRANSMISSION

CROSS-REFERENCE TO RELATED PATENT APPLICATIONS

This patent application is a continuation, of co-pending U.S. patent application Ser. No. 18/299,334, filed Apr. 12, 2023, which is a continuation of U.S. patent application Ser. No. 17/675,757, filed Feb. 18, 2022, which issued as U.S. Pat. No. 11,663,893, on May 30, 2023, which is a continuation of U.S. patent application Ser. No. 17/221,476, filed Apr. 2, 2021, which issued as U.S. Pat. No. 11,295,591 on Apr. 5, 2022, filed as a continuation of U.S. patent application Ser. No. 16/899,345, filed Jun. 11, 2020, which issued as U.S. Pat. No. 10,997,839 on May 4, 2021, filed as a continuation of U.S. patent application Ser. No. 16/113,796, filed Aug. 27, 2018, which issued as U.S. Pat. No. 10,720, 035 on Jul. 21, 2020, filed as a continuation of U.S. patent application Ser. No. 15/627,033, filed Jun. 19, 2017, which issued as U.S. Pat. No. 10,121,341 on Nov. 6, 2018, and which claims the benefit of U.S. Provisional Patent Application No. 62/449,465, filed Jan. 23, 2017, the entire teachings and disclosures of which are incorporated herein by reference thereto.

FIELD OF THE INVENTION

This invention generally relates to anti-theft systems such as would be used in a retail setting.

BACKGROUND OF THE INVENTION

Loss prevention is a continuing problem in the retail industry. Current anti-theft systems involve locking up merchandise behind counters, far away from related merchandise, or locking up the merchandise in secure cabinets, closer to the place where related merchandise is generally stored.

There are disadvantages to each of these methods. When merchandise is stored in a secured location away from the point of storage of related items, sales of the secured merchandise decrease because customers are less likely to go out of their way to locate a sales associate to retrieve the merchandise. Also, sales of related items that would otherwise be situated in proximity to the secured merchandise decrease as well because the customer is not drawn to their location.

Therefore, although common anti-theft systems may be effective at preventing loss, they also can have the significantly negative impact of reducing sales. For those customers who are not deterred by these systems, they also have the effect of occupying more of the sales associate's time than required for other merchandise not similarly protected.

Accordingly, there exists a need in the art for an anti-theft system for retail stores that will deter theft without discouraging the sale of the merchandise and related items. Additionally, the anti-theft system should be able to be retrofitted onto existing retail displays to keep the cost of installation and the shelving downtime required for installation as low as possible.

The invention provides such an anti-theft system. These and other advantages of the invention, as well as additional inventive features, will be apparent from the description of the invention provided herein.

BRIEF SUMMARY OF THE INVENTION

In one aspect, embodiments of the invention provide a signal-emitting retail display device that includes a wire having a top portion and a bottom portion, the top portion configured to support a label holder, the bottom portion configured to store one or more retail items. The signal-emitting retail display device also has an electronic unit that includes an emitter. The emitter is configured to emit an audible alarm or warning signal, and configured to wirelessly transmit a signal to a remotely-located alarm box indicative of the audible alarm or warning signal. The wire is electrically coupled to the electronic unit such that the wire functions as an antenna for the transmission of the signal to the alarm box.

In a particular embodiment, the top portion has a top end and the bottom portion has a bottom end, the top end and bottom end being in spaced relation to each other such that a label holder attached to the top end abuts the bottom end. The label holder may be configured to rotate away from the bottom end to allow merchandise to be removed from the bottom portion. The emitter may be configured to emit the audible alarm or warning signal when the label holder is rotated away from the bottom end.

In a further embodiment, the emitter is configured to emit an audible alarm when the label holder is rotated away from the bottom end, and configured to transmit a warning signal to the signal box when the label holder is rotated away from the bottom end for longer than a threshold length of time. In some embodiments, the emitter is configured to emit an audible alarm and transmit a warning signal to the signal box when the label holder is rotated away from the bottom end for longer than a threshold length of time. In other embodiments, the emitter is configured to emit an audible alarm and transmit a warning signal to the signal box is rotated away from the bottom end more than a predetermined number of times within a threshold length of time.

The signal-emitting retail display device may also include a U-shaped locking mechanism coupled to the electronic unit and configured to selectively rotate between an up position and a down position, wherein, in the down position, the U-shaped locking mechanism wraps around the bottom wire with the bottom wire passing through an aperture created by the U-shaped locking mechanism and the electronic unit, the U-shaped locking mechanism further configured to lock in the down position upon receipt of a signal by the electronic unit.

In another aspect, embodiments of the invention provide an alarm box that includes a receiver configured to receive a wireless signal from one or more signal-emitting retail display devices, an emitter configured to emit an audible signal indicative of the wireless signal received from the one or more signal-emitting retail display devices, and one or more terminals for connecting the alarm box to an output receiving device.

In certain embodiments, each of the one or more terminals is configured to connect to one of a computer, a pager, a cellular telephone, a public address system, computer memory, a video camera, and a video monitor. The alarm box may further include control circuitry configured to transmit a control signal used to activate or control the output receiving device. In some embodiments, the alarm box further includes a mode switching button for switching the alarm box between different modes of operation.

In particular embodiments, the alarm box has control circuitry that causes the emitter to emit a first audible signal when a first wireless signal from the one or more signal-emitting retail display devices indicates no-theft condition, and to emit a second audible signal, different from the first audible signal, when a second wireless signal from the one or more signal-emitting retail display devices indicates a theft condition. The control circuitry may also cause the emitter to emit the second audible signal when the first wireless signal is absent for a threshold amount of time.

In yet another aspect, embodiments of the invention provide a retail theft deterrent system that includes a signal-emitting retail display device having a wire with a top portion and a bottom portion, the top portion configured to support a label holder, the bottom portion configured to store one or more retail items. The theft deterrent system further includes an electronic unit that includes an emitter. The emitter is configured to emit an audible alarm or warning signal, and configured to wirelessly transmit a signal to a remotely-located alarm box indicative of the audible alarm or warning signal. The wire is electrically coupled to the electronic unit such that the wire functions as an antenna for the transmission of the signal to the alarm box. The alarm box includes a receiver configured to receive a wireless signal from one or more signal-emitting retail display devices. The alarm box also has an emitter configured to emit an audible signal indicative of the wireless signal received from the one or more signal-emitting retail display devices, and one or more terminals for connecting the alarm box to an output receiving device.

In certain embodiments, the alarm box fort retail theft deterrent system further comprises control circuitry configured to transmit a control signal used to activate or control the output receiving device. The output receiving device may be one of a computer, a pager, a cellular telephone, a public address system, computer memory, a video camera, and a video monitor. In a further embodiment, the alarm box further comprises control circuitry that causes the emitter to emit a first audible signal when a first wireless signal from the one or more signal-emitting retail display devices indicates no-theft condition, and to emit a second audible signal, different from the first audible signal, when a second wireless signal from the one or more signal-emitting retail display devices indicates a theft condition.

The emitter may be configured to either emit an audible alarm when the label holder is rotated away from the bottom end, and configured to transmit a warning signal to the signal box when the label holder is rotated away from the bottom end for longer than a threshold length of time, or to emit an audible alarm and transmit a warning signal to the signal box when the label holder is rotated away from the bottom end for longer than a threshold length of time, or to emit an audible alarm and transmit a warning signal to the signal box is rotated away from the bottom end more than a predetermined number of times within a threshold length of time.

In some embodiments, the alarm box further includes a mode switching button for switching the alarm box between different modes of operation, and wherein the signal-emitting retail display device is configured to change its mode of operation in accordance with the chosen alarm box mode of operation.

In certain embodiments, the signal-emitting retail display device may include a U-shaped locking mechanism coupled to the electronic unit and configured to selectively rotate between an up position and a down position, wherein, in the down position, the U-shaped locking mechanism wraps around the bottom wire with the bottom wire passing through an aperture created by the U-shaped locking mechanism and the electronic unit, the U-shaped locking mechanism further configured to lock in the down position upon receipt of a signal by the electronic unit.

In a further embodiment of the retail theft deterrent system, the aforementioned top portion has a top end and the bottom portion has a bottom end, the top end and bottom end being in spaced relation to each other such that a label holder attached to the top end abuts the bottom end. The label holder may be configured to rotate away from the bottom end to allow merchandise to be removed from the bottom portion. The emitter may be configured to emit the audible alarm or warning signal when the label holder is rotated away from the bottom end.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of the present invention provide a retail theft deterrent system having one or a plurality of signal-emitting retail devices 11 and alarm boxes 50 that, when used in various arrangements of the retail theft deterrent system, will deter theft without discouraging the sale of merchandise.

Figure 1:
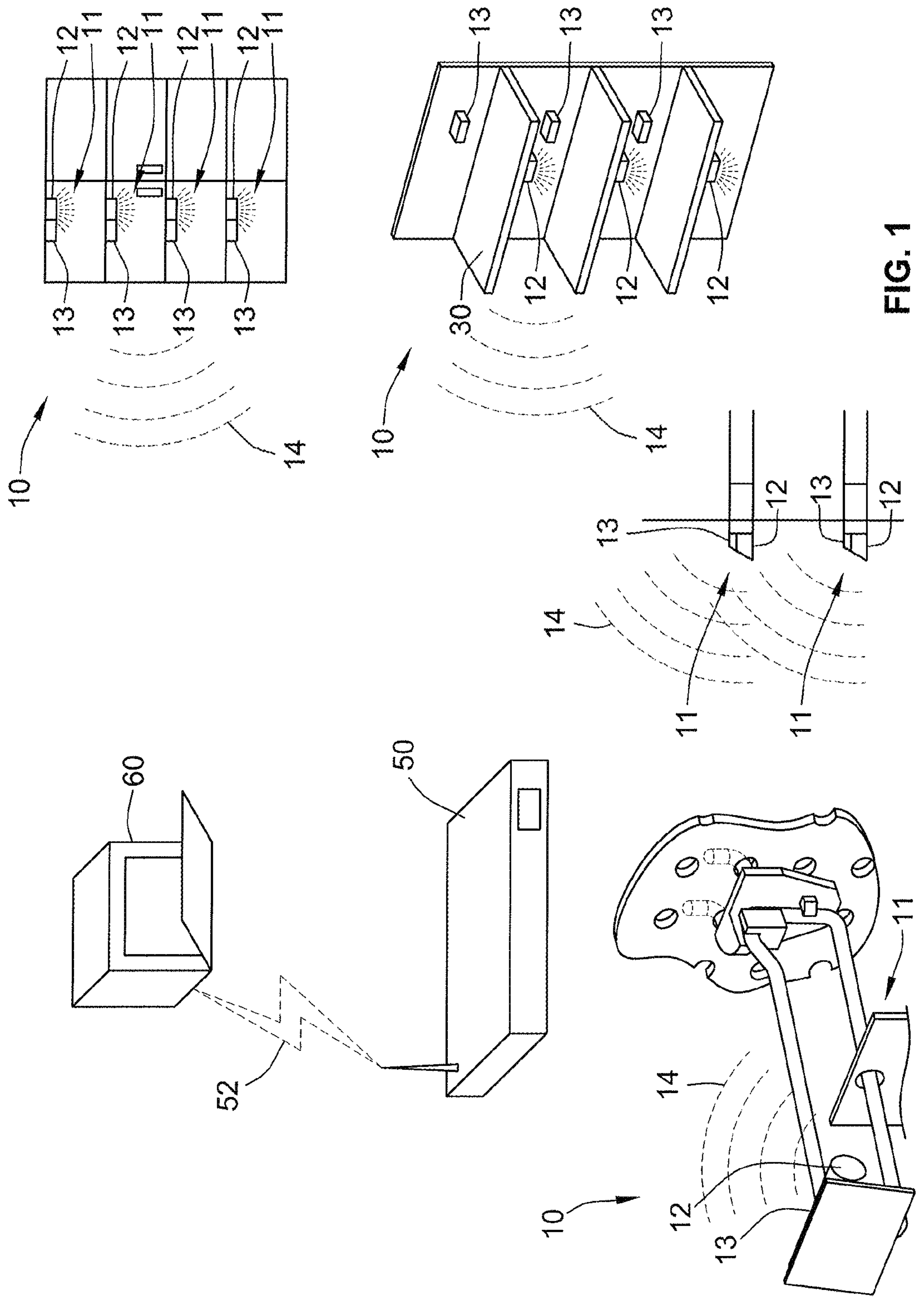
FIG. 1 is a perspective view of a signal receiver, an output receiving device, and retail display devices including embodiments of signal-emitting retail devices arranged as components in a theft deterrent system, according to the teachings of the present invention.

FIG. 1 illustrates an exemplary embodiment of a retail theft deterrent system. The retail theft deterrent system may include one of various embodiments of retail display devices 10, such as, in one embodiment, retail display devices configured to emit alarm signals, in a first arrangement of an embodiment of a theft deterrent system. The retail theft deterrent system may further include one or more alarm boxes 50 each configured to receive the alarm signals from the retail display devices 10. More particular embodiments of the invention may include an output receiving device 60, such as a computer configured to communicate with the alarm box 50.

In the retail theft deterrent systems of the present invention, use of various suitable signal alarm boxes or receiver units is envisioned. One such signal receiver unit that may be utilized in embodiments of theft deterrent systems described herein is further described in U.S. patent application Ser. No. 13/312,644 filed on Dec. 6, 2011, entitled Retail System Signal Receiver Unit, which is incorporated herein by reference thereto in its entirety.

The retail display devices 10 include signal-emitting retail devices 11 adapted to emit an RF signal 14 when merchandise is removed from the retail display devices or when the retail display devices are actuated to allow for merchandise to be removed. The signal-emitting retail devices 11 including an emitter 12 and a sensor 13. In a particular embodiment, the signal-emitting retail device 11 includes a mode switch 23 (shown in FIGS. 2, 3, and 7) to change the signal-emitting retail device 11 between at least two different modes of operation (e.g., modes "A" and "B"). In some embodiments, the emitter 12 and sensor 13 may be arranged in a single housing. In other embodiments, the emitter 12 and sensor 13 may be separate units in operative communication.

The sensor 13 is arranged and configured in some embodiments to sense when a retail display device 10 is actuated to allow for removal of merchandise, such as, for example, to sense when a door of a display case is opened or when a label holder blocking removal of merchandise in a first configuration is moved to a second configuration in which merchandise is allowed to be removed. In other embodiments, a sensor 13 is arranged and configured to sense when merchandise is removed from a shelf. Sensors 13 may be motion sensors, inductive sensors, capacitive sensors, optical sensors, piezo electric sensors, or any other type of sensor known in the art for determining when merchandise is removed from a retail display device 10 or when a retail display device 10 is actuated to allow removal of merchandise. Specific embodiments of sensor arrangements will be discussed further below.

In one embodiment the emitters 12 of the signal-emitting retail devices 11 are also adapted to transmit signals as will be discussed further below, increasing in frequency, frequency of occurrence, or decibel level, when a condition is sensed by sensors 13 that would indicate a potential theft condition. Such conditions are further discussed below.

In a first embodiment of a theft deterrent system, with reference to FIG. 1, RF signals 14 emitted by the signal-emitting retail devices 11 are received by the alarm box 50. The alarm box 50 is configured to receive and process these RF signals 14. The signals RF 14 may include a variety of information for the alarm box 50, including identification of the particular retail display unit 10 from which the signal was emitted, an identification of whether an item of merchandise has been removed, the retail display unit 10 has been actuated, or a potential theft condition exists. The alarm box 50 receives the RF signals 14, processes and determines the information contained therein. In some particular embodiments, the alarm box 50 sends a signal 52 to the output receiving device 60.

In one embodiment, the emitters 12 may include a speaker or speakers and are configured to emit audible signals. In other embodiments, the emitters may emit a video signals in addition to the audio signals. Additionally, the emitter 12 is configured to transmit an RF signal to the alarm box 50 which may have characteristics that indicate to the alarm box 50, the retail display unit 10 from which the RF signal was emitted, whether there is a normal condition that indicates a regular customer removal of merchandise from a retail display unit 10 or a customer actuating a retail display unit 10 to remove an item of merchandise, or whether a potential theft condition exists to which store personnel should be alerted. The alarm box 50 then sends a signal 52, if appropriate, to an output receiving device 60 configured to alert store personnel to the potential theft condition. This first arrangement may be effective in large retail environments where store personnel may be too far away to hear a particular audible signal from the emitter 12 indicating a potential theft condition.

In one embodiment, the output receiving device 60 may be a computer, a pager, a cellular telephone, a public address system, computer memory, one or more video cameras, video monitors, or any other device capable of receiving a signal 52. The receiving device 60 may be connected to the alarm box 50 using wired or wireless means, and may be networked with other receiving devices located on or off site, or may be a stand-alone unit located on or off site relative to a retail establishment.

In a particular embodiment, the signal-emitting retail devices 11 may be configured to emit various types of encoded signals using any suitable protocol. In alternate embodiments of the invention, the signal emitted may include one of infrared light, visible light, and microwaves. Additionally, the signal 52 emitted by the alarm box 50 may be of any suitable type and may be an encoded signal using any suitable protocol.

It will be understood that the signal-emitting retail devices 11 can be used in many different arrangements, and the quantity and type of signal-emitting retail devices 11 and other components shown are exemplary and for illustrative purposes only.

Figure 2:
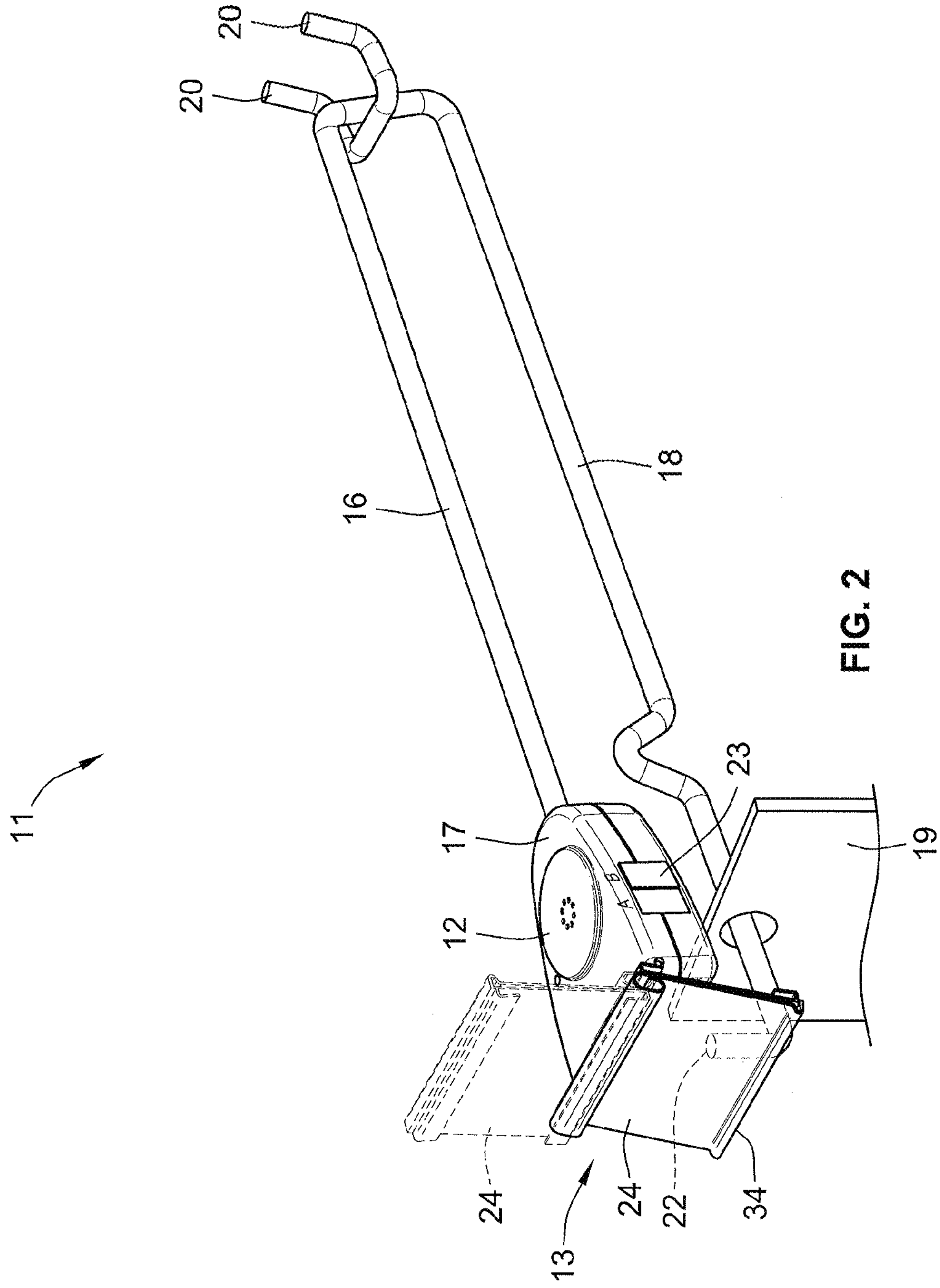
FIG. 2 is a detailed view of a signal-emitting retail device of FIG. 1.

With reference to FIG. 2, the structural elements of an embodiment of the signal-emitting retail device 11 are discussed. The signal-emitting retail device 11 includes a display interfacing portion 15. The display interface portion 15 includes upturned hooks 20 adapted to fit in a pegboard style mounting surface to support the signal-emitting retail device 11. However, many other mounting arrangements are also envisioned, including mounting arrangements adapted to be installed on slatwall and wire-cage-type retail display surfaces.

With reference to FIG. 2, in one embodiment, extending from the display interfacing portion 15 in a direction opposite the upturned hooks 20, the signal-emitting retail device 11 includes a wire that has top portion and a bottom portion. The top portion, referred to herein as the top wire 16, and the bottom portion, referred to herein as the bottom wire 18, extend generally parallel with one another. This arrangement illustrated in FIG. 2 may be referred to as a hook or a display hook. The top wire 16 extends from the display interfacing portion 15 to an electronic unit 17 including an emitter 12 and a sensor 13. The electronic unit 17 is supported by the top wire 16 and fixedly attached to the end of the top wire 16 distal from display interfacing portion 15. The electronic unit 17 extends generally orthogonal to the top wire 16. In this embodiment, the electronic unit 17 includes the mode switch 23 to change the signal-emitting retail device 11 between at least two different modes of operation (e.g., modes "A" and "B").

In embodiments of the invention, the top wire 16 and bottom wire 18 are made of metal, and are electrically connected to the emitter 12 such that the top wire 16 and bottom wire 18 function as an antenna for the emitter 12. Due to the greater size of the top and bottom wires 16, 18 as compared to a conventional antenna (i.e., an internal antenna), the range of reliable communication between the signal-emitting retail device 11 and the alarm box 50 may be effectively double what it would be if the conventional internal antenna were used.

With further reference to FIG. 2, in one embodiment, rotatably coupled to the electronic unit 17 is a label holder 24. The label holder 24 is adapted to hold any suitable label, for example, for displaying relevant information regarding merchandise, such as price, description of the merchandise, etc. The label holder 24 rests in a normal position hanging from the electronic unit 17. The label holder 24 can also be actuated by a customer by pivotally rotating the label holder 24 upward to a second, merchandise removal configuration (label holder 24 in the second configuration shown in phantom lines). In the embodiment shown, the label holder 24 is coupled to, and extends from, an end of the top wire 16 at about a ninety-degree angle relative thereto toward the bottom wire 18. In its normal hanging (or rotated down) position, the label holder 24 abuts an end of the bottom wire.

In other embodiments, the label holder 24 is displaceable in other manners. For example, in one embodiment the label holder is slidably displaceable upwardly relative to the electronic unit 17 and the top wire 16. Other suitable types of displacement are also envisioned.

With further reference to FIG. 2, the bottom wire 18 extends from the display interfacing portion 15, spaced apart from the top wire 16. The bottom wire 18 is configured to support merchandise 19 with packaging defining an aperture for receiving the bottom wire 18. In a particular embodiment, the bottom wire 18 includes an upturned segment 22 at the end of the bottom wire 18 distal from the interfacing portion 15. The upturned segment 22 extends at an approximately 90-degree angle relative to the rest of the bottom wire 18, toward the top wire 16. The upturned segment 22 is located closer to the display interfacing portion 15 than the label holder 24, and thus the label holder 24 would be located between the upturned segment 22 and a customer.

Figure 3:
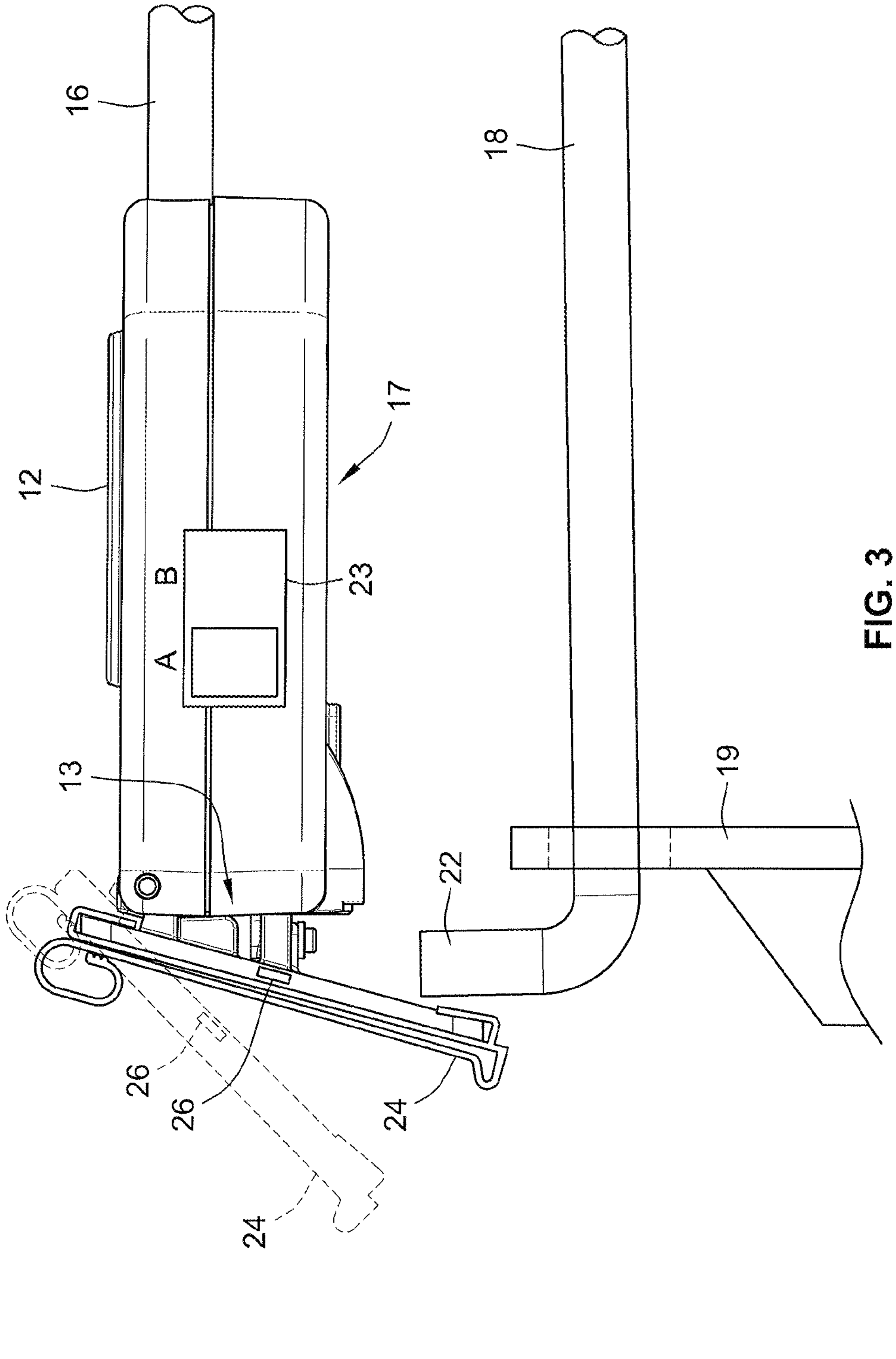
FIG. 3 is a side view of the signal-emitting retail device of FIG. 2 illustrating actuation of a label holder and removal of merchandise.
Figure 7:
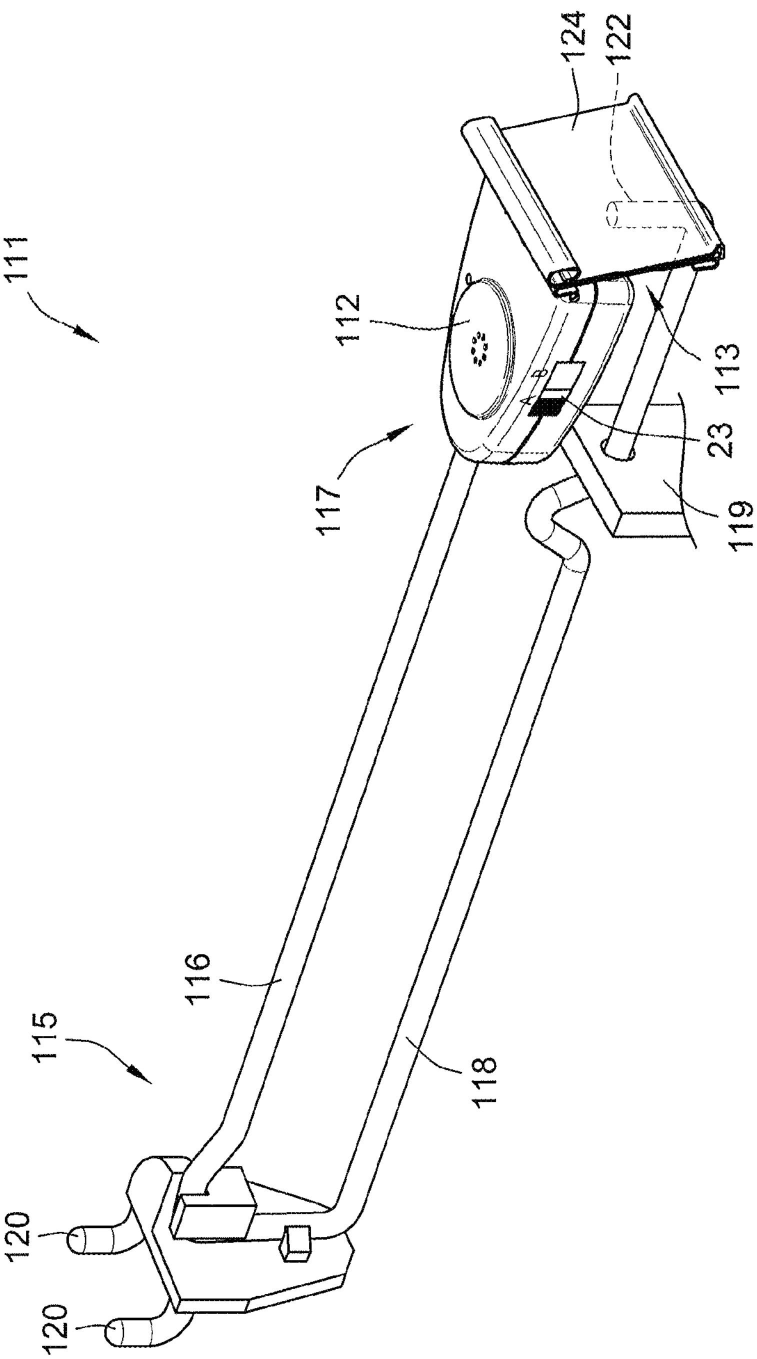
FIG. 7 is a perspective view of another embodiment of the signal-emitting retail device.

In particular embodiments, such as shown in FIGS. 2, 3, and 7, the top and bottom wires 16 and 18 may be portions of a single wire bent proximate a median point, with the bent portion mounted to the display interfacing portion 15. In another embodiment the wires 16 and 18 may be separate wires. The signal-emitting retail device 11 may have different overall lengths and distances between the top and bottom wires 16 and 18 in order to accommodate different types of merchandise. The top and bottom wires 16 and 18 of the signal-emitting retail device 11 may be made of any suitable rigid material, including but not limited to a rigid metal or plastic.

With further reference to FIG. 2, in one embodiment the signal-emitting retail device 11 also includes a magnet 26, or, alternatively, some type of magnetic switch, reed switch, Hall-effect sensor, etc. The magnet 26 is fixedly attached to an inner surface (e.g., a surface of a slot for inserting a label into the label holder 24) of the label holder 24. The label holder 24 is arranged such that when it is in its resting, hanging first configuration, the magnet 26 is proximate the electronic unit 17. In particular embodiments, the signal-emitting retail device 11 may also include an LED indicator to show that mode and status of the device 11. In certain embodiments, the signal-emitting retail device 11 is battery-operated. Given the relatively low power requirements of the signal-emitting retail device 11, the device 11 may be expected to operate for up to 12 months, depending on the type of battery used.

With reference to FIG. 3, when the label holder 24 is in the resting, hanging first configuration, its inner surface 21 is proximate to the upturned segment 22 of the bottom wire 18. As such, in order for the merchandise 19 to be removed from the bottom wire 18, the label holder 24 must be lifted from the resting configuration to a second merchandise removal configuration (shown in dashed lines). When the label holder 24 is in this second configuration, the magnet 26 that is fixedly attached to the label holder 24 is no longer in a position proximate the electronic unit 17. As is discussed in further detail below, the removal of the magnet 26 from a position proximate the electronic unit 17 causes the electronic unit 17 to emit the RF signal 14.

Figure 4:
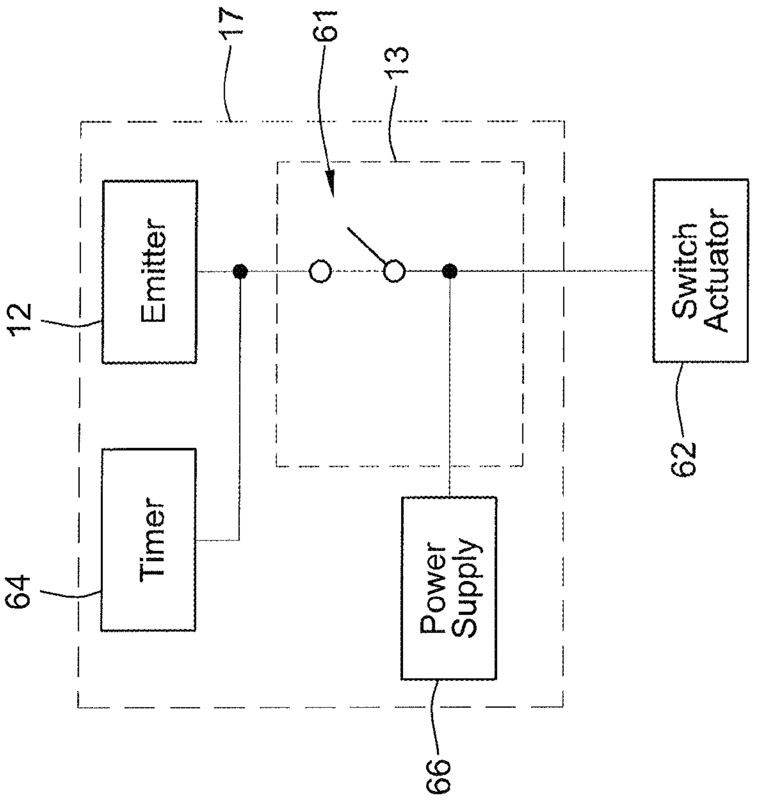
FIG. 4 is schematic representation of components of the signal-emitting retail device of FIGS. 2 and 3.

With reference to FIG. 4, a functional schematic of the internal components of an embodiment of a retail display device 10 is discussed. The electronic unit 17 includes the emitter 12 and the sensor 13. The sensor 13 includes a switch 61, which is adapted to transition between an open configuration (shown in solid lines) and a closed configuration (shown in dashed lines) upon actuation by an external switch actuator 62. The switch 61 may include any suitable type of switching device capable of transitioning between at least a first state and a second state. The external switch actuator 62 may include various different actuators, including physical actuators, magnetic actuators, electrical actuators, and any other suitable type of actuator known in the art. Particular embodiments of actuators are discussed further below.

With further reference to FIG. 4, in one embodiment the electronic unit 17 also includes a power supply 66. The power supply 66 may be any suitable type of battery, a solar power collector, or any other type of power supply. In one embodiment, the power supply 66 may be external to the electronic unit 17, and may be any suitable type of power supply.

In one embodiment the electronic unit 17 also includes a timer 64, which is electrically coupled with the emitter 12. The timer 64 is also electrically coupled with the power supply 66 through the switch 61 when the switch 61 is the closed configuration. As will be further described below, the timer 64 is configured to determine, keep track of, etc. the amount of time between when the switch 61 closes and when the switch 61 opens. If the timer 64 measures an amount of time that is less than a predetermined amount of time, the emitter 12 emits a signal indicative of a normal condition of a piece of merchandise being removed from the signal-emitting retail device 11. However, if the amount of time measured by the timer 64 exceeds the predetermined amount of time, the emitter 12 emits a second signal indicative of a potential theft condition. The predetermined amount of time may be adjusted and set to a greater or lesser amount of time by a user.

In one embodiment, the emitter 12, in addition to transmitting an RF signal to the alarm box 50, may be configured to emit an audible signal. In this embodiment, the second signal indicative of a potential theft condition may be of a different pitch, frequency, decibel level, wavelength, frequency of occurrence, etc. than the signal indicative of a normal condition in which a piece of merchandise is removed. Additionally, the second signal indicative of a potential theft condition may include a pre-recorded or pre-generated message including words. In this embodiment, the signal alarm box 50 (illustrated in FIG. 1) may be configured to monitor for, distinguish, recognize, and respond to the variety of pitches, frequencies, wavelengths, frequencies of occurrence, and decibel levels of signals emitted by the emitter 12.

In another embodiment, with further reference to FIG. 4, upon closing of the switch 61, the emitter 12 is configured to emit a signal indicative of a normal condition of removal of a piece of merchandise and the timer 64 is configured to begin timing. If the timer 64 exceeds the preset time before the switch 61 is opened, the emitter 12 emits a signal indicative of a potential theft condition.

Figure 5A:
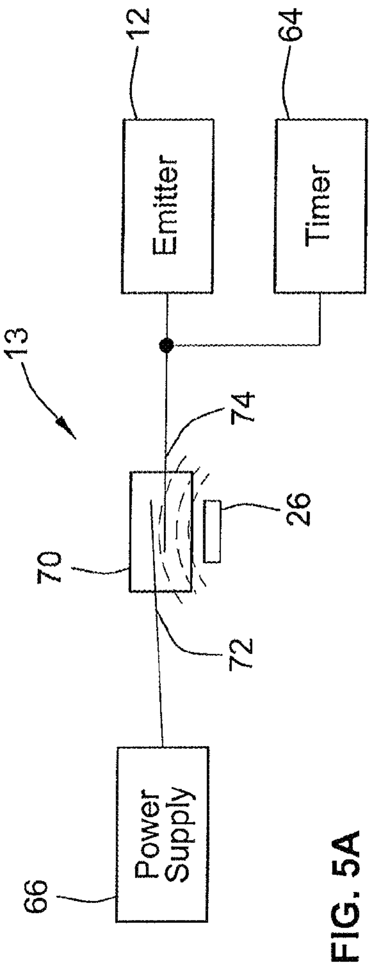
FIG. 5A is a schematic representation of an embodiment of the signal-emitting retail device including a reed switch in an open configuration.
Figure 5B:
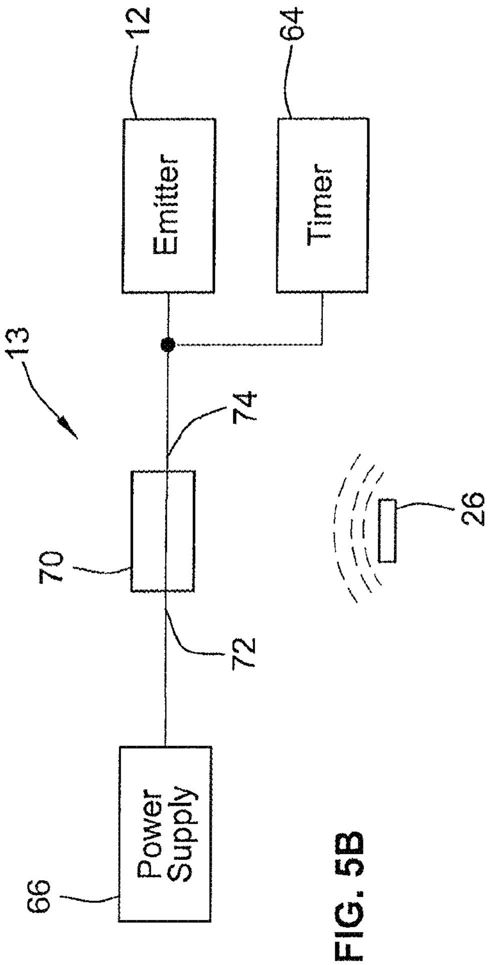
FIG. 5B is a schematic representation of an embodiment of the signal-emitting retail device including a reed switch in an open configuration.

With reference to FIGS. 5A and 5B, in one embodiment, the sensor 13 includes a reed switch 70 with a pair of leads 72 and 74. The first lead 72 is electrically coupled with the power source 66 and the second lead 74 is electrically coupled with the emitter 112. The reed switch 70 is a normally closed reed switch, such that the leads 72 and 74 are normally electrically coupled, as illustrated in FIG. 5B. However, in the presence of the magnet 26, the leads 72 and 74 become disconnected.

Thus, when the label holder 24 is in the first, down, normal hanging configuration (solid line in FIG. 2), the magnet 26 is proximate the electronic unit 17, and thus, the leads 72 and 74 are in a disconnected configuration, as in FIG. 5A. However, when the label holder 24 is in the second, up, raised, merchandise removal configuration (broken line in FIG. 2), the magnet 26 is moved away from the electronic unit 17 and the leads 72 and 74 are in a connected configuration, as in FIG. 5B, connecting the power supply 66 to the emitter 12 and timer 64. Thus, in this embodiment the magnet 26 acts as the switch actuator 62 (FIG. 4). In order to remove merchandise, the label holder 24 must be moved to its second, up, raised, merchandise removal configuration, thus moving the magnet 26 away from the electronic unit 17, closing the switch 70, applying power to the timer 64 and emitter 12. Thus, signal-emitting retail device 11 may be alerted to when merchandise is removed, and may in one embodiment, keep track of available inventory on a retail display device 10 and automatically alerting store personnel or ordering additional inventory when the inventory falls below a preset level.

Additionally, a potential thief may raise the label holder 24 to its second, up raised, merchandise removal configuration for an extended period of time to allow the thief to remove large quantities of merchandise from the retail display device 10 all at once. This will cause the magnet 26 to be away from the electronic unit 17 and thus the switch 70 to be closed for an extended period of time. The timer 64, when the period of time the switch 70 is closed exceeds the predetermined period, can cause the emitter 12 to emit a second signal indicative of a potential theft condition, alerting the signal alarm box 50 and store personnel of the potential theft condition, and thus deterring theft.

The timer 64 may be any suitable type of timer, including, for example, a digital counter, clock, etc., and may count up or count down. For example, in one embodiment upon application of power to the timer 64, the timer 64 may begin at a predetermined value and count down, where, upon reaching zero, a potential theft condition signal could be emitted by the emitter 12. In this embodiment, the timer 64 may be reset to the predetermined value. Additionally, in another embodiment, upon application of power to the timer 64, the timer 64 may begin counting up and, upon reaching a predetermined value, a potential theft condition signal could be emitted by the emitter 12. In this embodiment, the timer 64 may be reset to zero.

Figure 6A:
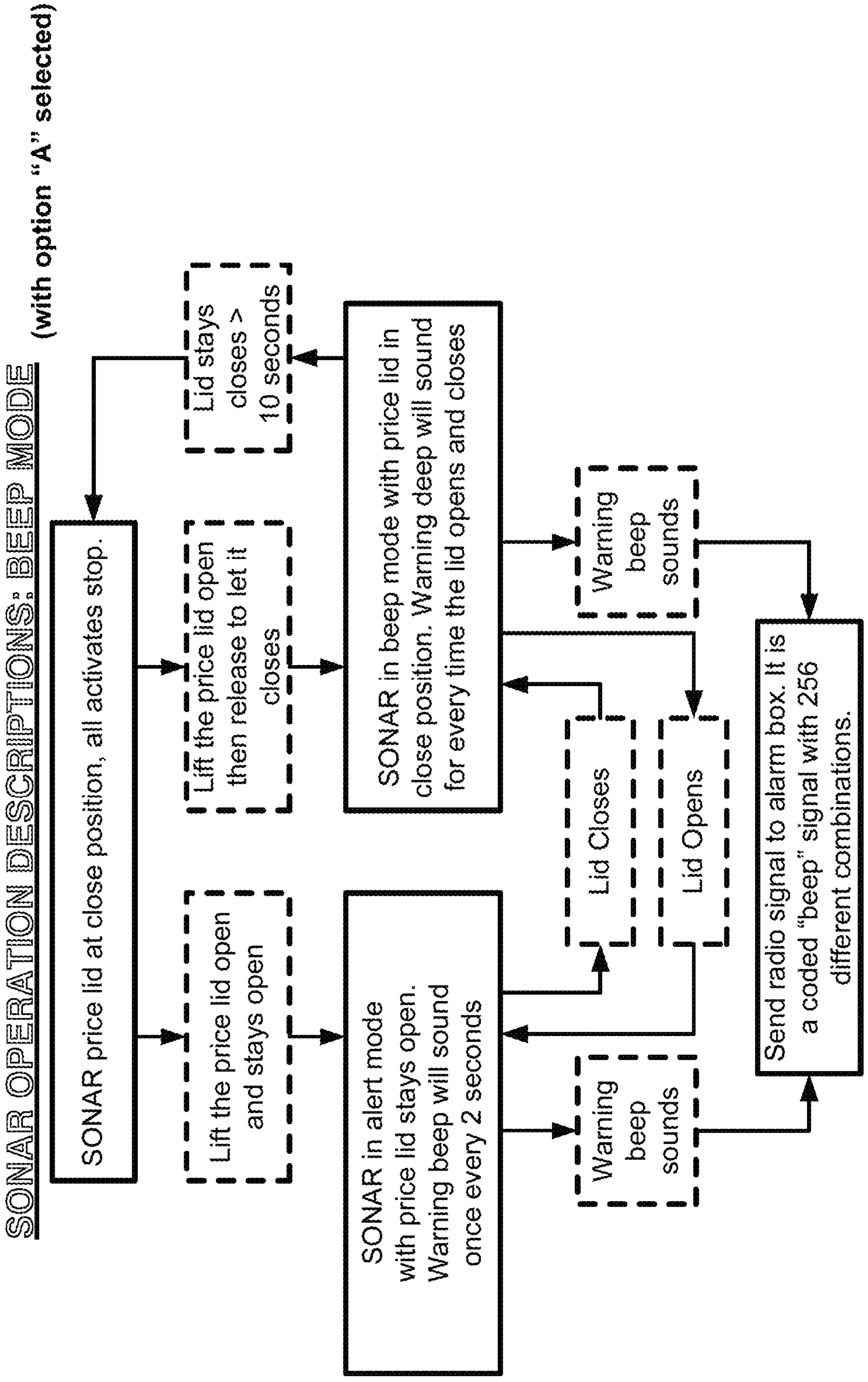
FIGS. 6A-6D are flow diagrams illustrating operation of embodiments of the signal-emitting retail device of FIGS. 2 and 3.

With reference to FIG. 6A, a flow diagram of the functionality of an embodiment is illustrated. More specifically, FIG. 6A describes operation of the signal-emitting device 11 when the mode switching button 408 (shown in FIG. 9) is in position "B", which in this case indicates that the device 11 is in "Beep Mode". In this mode of operation, the signal-emitting retail device 11 is not actuated as long as the label holder 24 is in its normal closed position. When the label holder 24 is rotated up, relative to the electronic unit 17 (see FIG. 2), from normally-closed configuration to the merchandise removal configuration, this moves the magnet 26 (see FIG. 2) away from the electronic unit 17. This causes the leads 72 and 74 (see FIG. 5B) to connect and the switch 70 to close. Thus, power is applied to the emitter 12 and to the timer 64, which starts the timer. When the label holder 24 is quickly rotated back down to its normally-closed position, the timer 64 stops receiving power, which resets the timer 64. As a result, the emitter 12 emits a signal, such as a beep, indicative of normal merchandise removal. In this embodiment, the signal-emitting retail device 11 sends an RF signal to the alarm box 50 indicative of the normal merchandise removal.

As long as the timer is still receiving power, and the time is less than the predetermined time value, the timer 64 continues timing. If the label holder 24 remains rotated up in the merchandise removal configuration, once the time exceeds the predetermined time value, the signal-emitting retail device 11 will go into "Alert Mode" in which the emitter 12 emits, for example, a series of beeps every one or two seconds, the signal being indicative of a potential theft condition 92. In this embodiment, if the label holder 24 remains rotated down in the normally-closed position for some predetermined length of time, e.g., 10 seconds, the signal-emitting retail device 11 is deactivated.

Figure 6B:
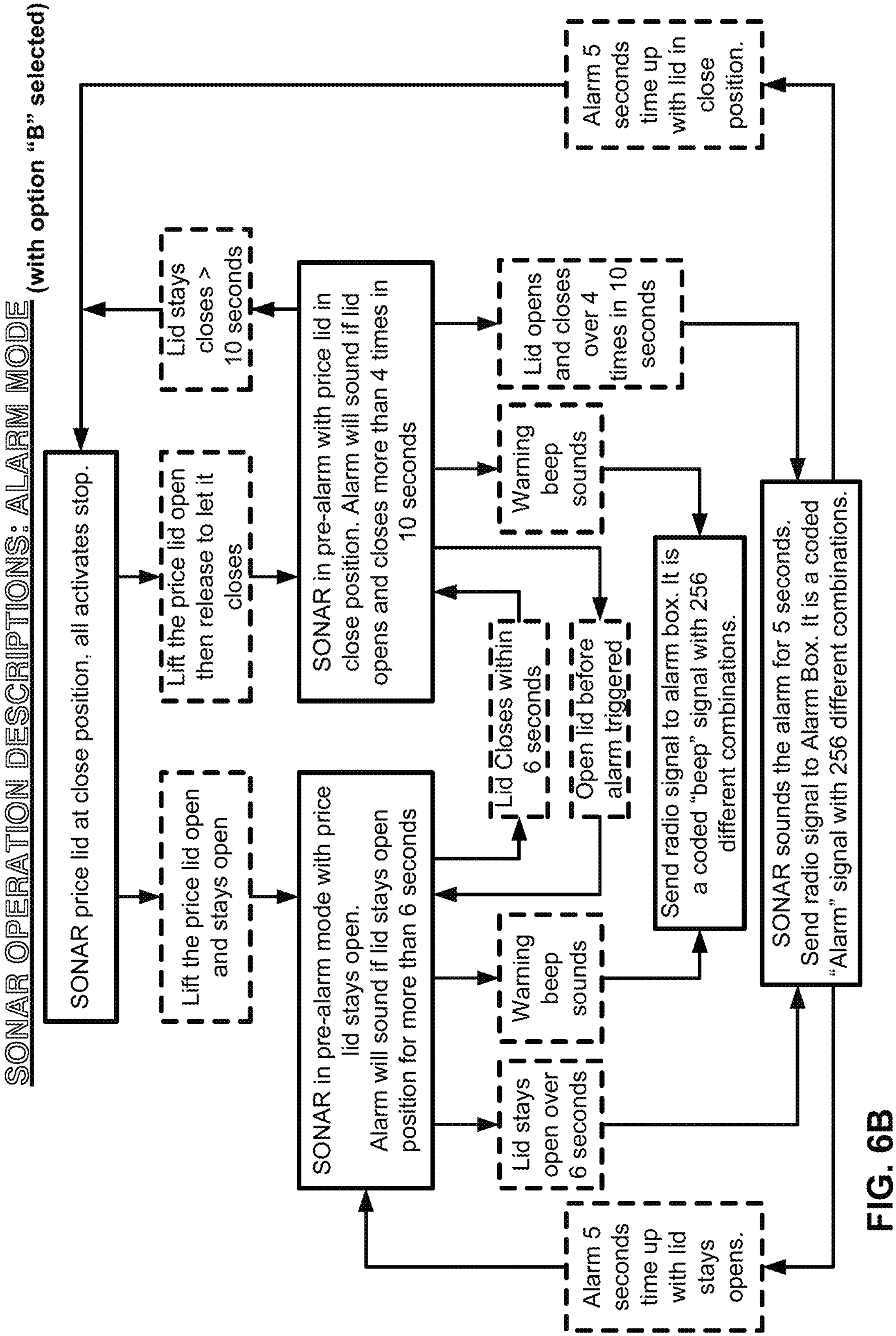

With reference to FIG. 6B, a flow diagram of the functionality of an embodiment is illustrated that describes operation of the signal-emitting device 11 when the mode switching button 408 (shown in FIG. 9) is in position "A", which in this case indicates that the device 11 is in "Alarm Mode". In this mode of operation, the signal-emitting retail device 11 is not actuated as long as the label holder 24 is in its normally-closed position. When the label holder 24 is rotated up and quickly rotated back down to its normally-closed position, the signal-emitting device 11 goes into pre-alarm mode. If the label holder 24 is rotated up and quickly released a designated number of times over a predetermined time period, e.g., four times in 10 seconds, the signal-emitting retail device 11 will sound an alarm and transmit a signal to the alarm box 50 indicating the alarm mode. Further, if the label holder 24 is rotated up for greater than a threshold amount of time, the signal-emitting retail device 11 will sound an alarm and transmit a signal to the alarm box 50 indicating the alarm mode.

Figure 6C:
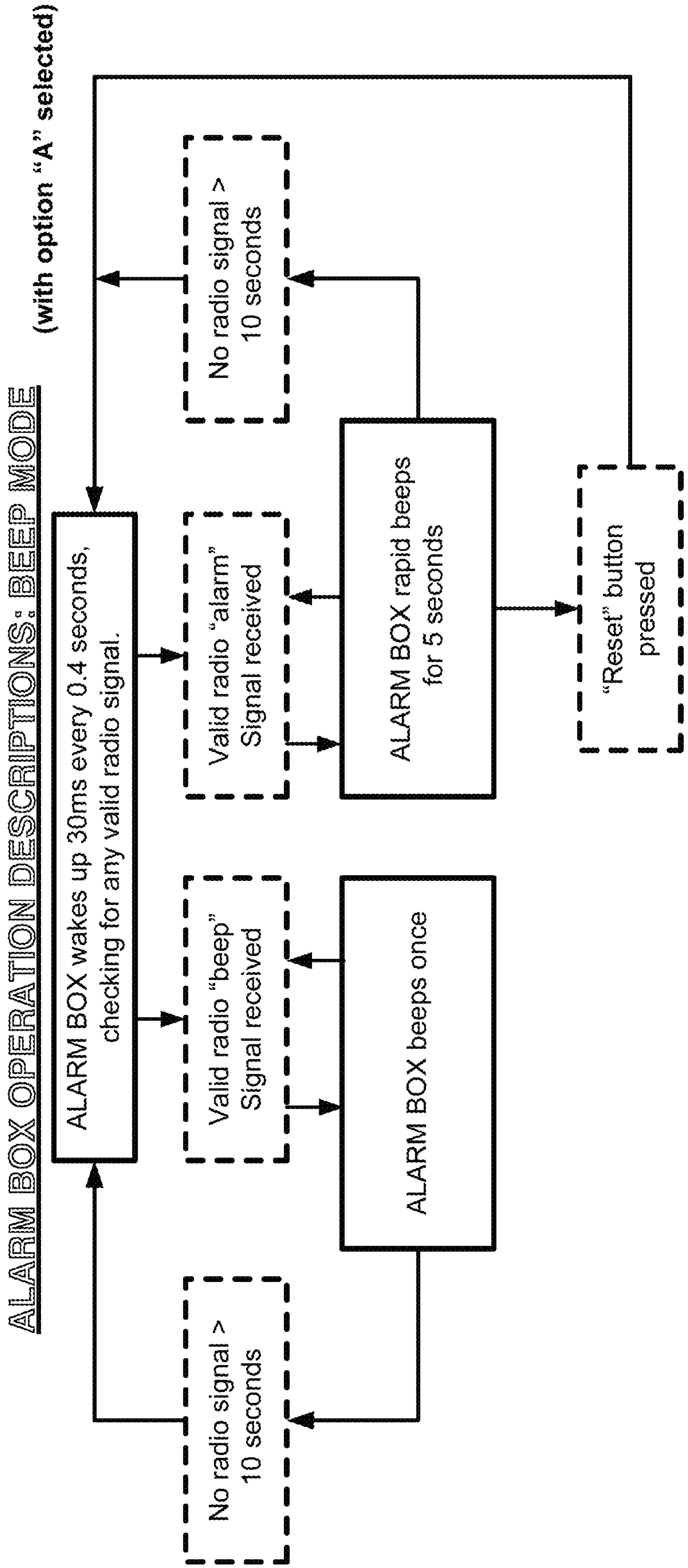

With reference to FIG. 6C, a flow diagram is illustrated that describes operation of the alarm box 50 when the mode switching button 408 (shown in FIG. 9) is in position "B", which in this case indicates that the alarm box 50 is in "Beep Mode". In this mode, the alarm box 50 periodically checks for a valid RF signal from one or more signal-emitting retail devices 11. In the embodiment shown, the alarm box 50 checks for this RF signal for 30 milliseconds every four tenths of a second. If the RF signal indicates a normal merchandise removal the alarm box may provide an audible, or some other suitable signal, indicative of the normal merchandise removal. If the RF signal indicates an alert mode due to a possible theft, the alarm box may provide an audible, or some other suitable signal, indicative of the alert mode.

Figure 6D:
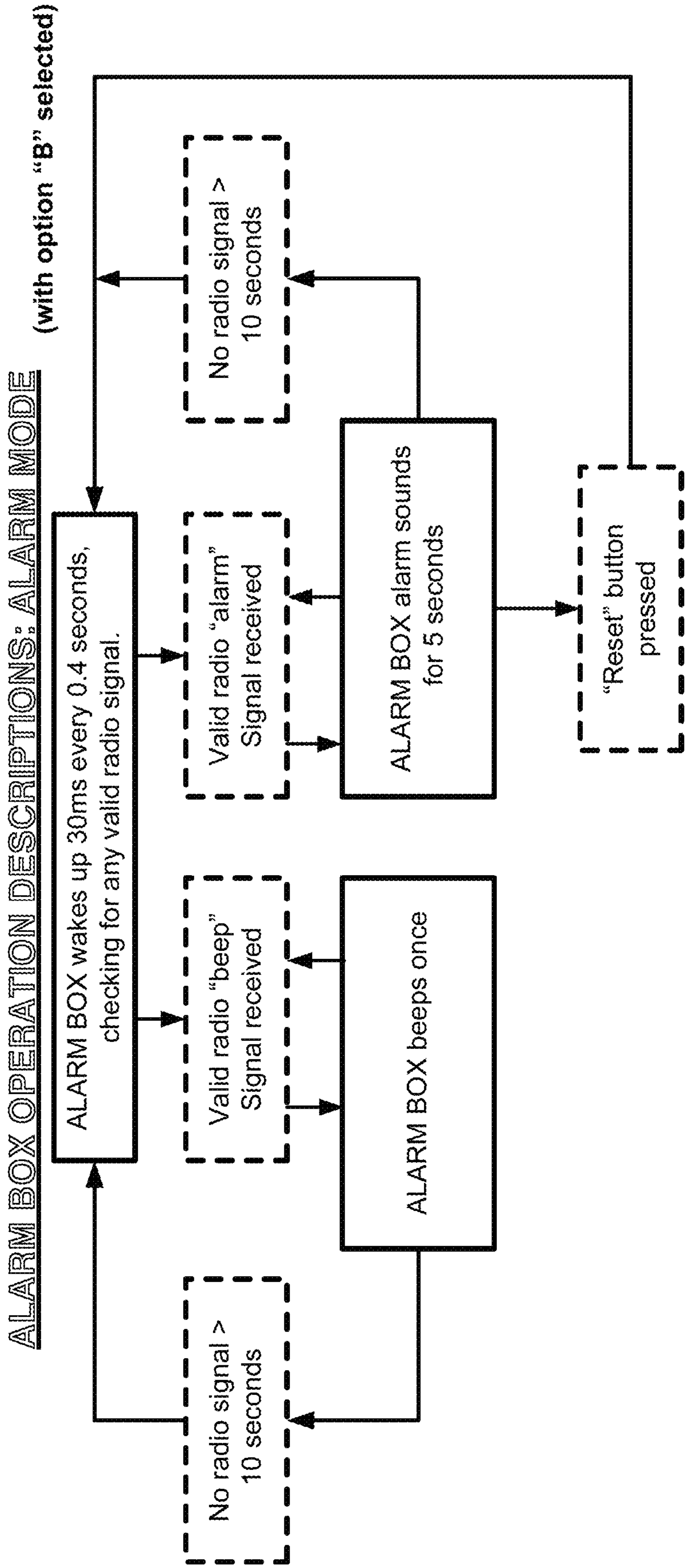

With reference to FIG. 6D, a flow diagram is illustrated that describes operation of the alarm box 50 when the mode switching button 408 (shown in FIG. 9) is in position "A", which in this case indicates that the alarm box 50 is in "Alarm Mode". In this mode, the alarm box 50 periodically checks for a valid RF signal from one or more signal-emitting retail devices 11. In the embodiment shown, the alarm box 50 checks for this RF signal for 30 milliseconds every four tenths of a second. If the RF signal indicates a normal merchandise removal the alarm box may provide an audible, or some other suitable signal, indicative of the normal merchandise removal. If the RF signal indicates an alert mode due to a possible theft, the alarm box may provide an audible, or some other suitable signal, indicative of the alert mode.

With reference to FIG. 7, in one embodiment a label holder 124 includes springs such that an additional spring force pushes the label holder 124 back to its resting position after the merchandise 119 is removed. In a particular embodiment, the bottom wire 118 includes an upturned segment 122 at the end of the bottom wire 118 distal from the interfacing portion 115. The upturned segment 122 extends at an approximately 90-degree angle relative to the rest of the bottom wire 118, toward the top wire 116.

The signal-emitting retail device 111 includes a display interfacing portion 115. The display interface portion 115 includes upturned hooks 120 adapted to fit in a pegboard style mounting surface to support the signal-emitting retail device 111. Extending from the display interfacing portion 115 in a direction opposite the upturned hooks 120, the signal-emitting retail device 111 includes a wire with top portion and bottom portions. The top portion, or top wire 116, and the bottom portion, or bottom wire 118, extend generally parallel with one another. The upturned hooks 120 adapted to fit in a pegboard style mounting surface to support the signal-emitting retail device 111. Other features of this embodiment of the signal-emitting retail device 111 are similar to previous embodiments (i.e., the top wire 116, bottom wire 118, display interface portion 115).

This arrangement illustrated in FIG. 7 may be referred to as a hook or a display hook. The top wire 116 extends from the display interfacing portion 115 to an electronic unit 117 including an emitter 112 and a sensor 113. The electronic unit 117 is supported by the top wire 116 and fixedly attached to the end of the top wire 116 distal from display interfacing portion 115. In embodiments of the invention, the top wire 116 and bottom wire 118 are made of metal, and are electrically connected to the emitter 112 such that the top wire 116 and bottom wire 118 function as an antenna for the emitter 112. Due to the greater size of the top and bottom wires 116, 118 as compared to a conventional antenna (i.e., an internal antenna), the range of reliable communication between the signal-emitting retail device 111 and the alarm box 50 may be effectively double what it would be if the conventional internal antenna were used. In the embodiment of FIG. 7, the electronic unit 117 includes the mode switch 23 shown in FIGS. 2 and 3.

Figure 8:
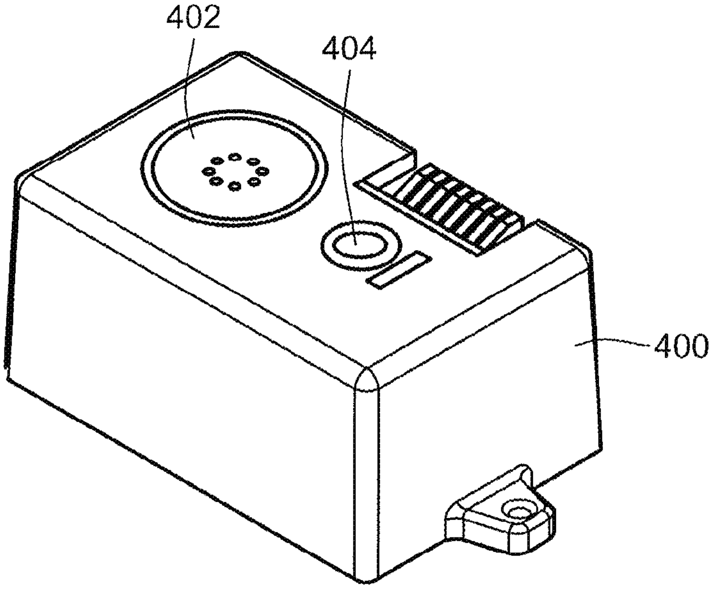
FIGS. 8 and 9 are perspective and side views, respectively, of an alarm box, constructed in accordance with an embodiment of the invention.
Figure 9:
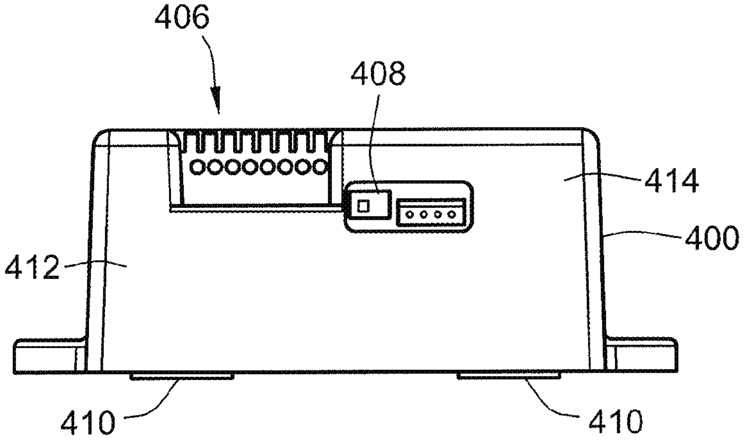

FIGS. 8 and 9 are perspective and side views, respectively, of the alarm box 50, constructed in accordance with an embodiment of the invention. As shown, the alarm box 50 has a housing 400. In the embodiment of FIG. 8, the alarm box 50 has a speaker 402 and a reset button 404 on a top side of the housing 400. When pressed, the reset button 404 turn off an alarm being sounded by the alarm box 50. In particular embodiments, the user may select from a number of different alarm sounds.

The plan view of FIG. 9 shows a plurality of terminals 406, which allow for connection of the alarm box 50 to any number of output receiving devices 60 (see FIG. 1), including, but not limited to, a computer, a pager, a cellular telephone, a public address system, computer memory, one or more video cameras, and video monitors. The signal (e.g., an alarm signal indicating a potential theft) from the alarm box 50 may be used to activate or control the output receiving device 60.

The alarm box 50 may further include control circuitry 414 configured to transmit a control signal used to activate or control the output receiving device 60. In particular embodiments, the control circuitry 414 is also configured to that causes the emitter to emit a first audible signal when a first wireless signal from the one or more signal-emitting retail display devices indicates no-theft condition, and to emit a second audible signal, different from the first audible signal, when a second wireless signal from the one or more signal-emitting retail display devices indicates a theft condition. The control circuitry may also cause the emitter to emit the second audible signal when the first wireless signal is absent for a threshold amount of time.

In FIG. 9, a mode switching button 408 is shown adjacent to the plurality of terminals 406. The mode switching button 408 may be designed to switch between a beep mode and an alarm mode, as described above. In certain embodiments, the housing 400 has one or more magnets 410 attached to facilitate mounting of the alarm box 50 to a metal surface. Like the signal-emitting retail device 11 (shown in FIG. 2) described above, the alarm box 50 may be battery-operated. Due to low power requirements, the alarm box 50 can be expected to operate for many months before needing to replace the batteries.

The alarm box 50 may have an internal RF antenna that is part of a receiver 412, such that the alarm box 50 is configured to receive a wireless signal from one or more signal emitting devices 11 (shown in FIG. 2). In certain embodiments, the alarm box 50 is also configured to emit a variety of different audio signals which may be indicative of, for example, a location of the signal emitting device 11, or the type of merchandise displayed on the signal emitting device 11. The alarm box 50 may be configured to recognize one or more signal emitting devices 11 each having a particular identification code. For example, the alarm box 50 may recognize only those signal emitting devices 11 having a first identification code, while ignoring signals from signal emitting devices 11 having a different identification code.

Thus, a retail operation may employ several alarm boxes 50, each recognizing a different identification code, and thus each recognizing the signal from a different group of signal emitting devices 11 (see FIG. 2). This allows the retail operator to segregate or distinguish various retail items by using signal emitting devices 11 and alarm boxes 50 with a specific identification code that corresponds with a particular type of retail item. The alarm boxes 50 may be paired with signal emitting devices 11 having a specific identification code such that the warning beeps and alarm signals are synchronized. In a particular embodiment, the alarm box is configured to recognize up to 256 unique identification codes, and the signal emitting device 11 can be configured with 256 unique identification codes.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention, and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A signal-emitting retail display device comprising:

a wire having a top portion and a bottom portion, the top portion configured to support a label holder; and an electronic unit that includes an emitter, the emitter being configured to emit a warning signal, and configured to transmit a wireless signal to an alarm box in response to the warning signal;

wherein the wire is electrically coupled to the electronic unit such that the wire functions as an antenna for the transmission of the wireless signal to the alarm box.

2. The signal-emitting retail display device of claim 1, wherein the top portion has a top end and the bottom portion has a bottom end, the top end and bottom end arranged in spaced relation to each other such that a label holder attached to the top end abuts the bottom end;

wherein the label holder is configured to rotate away from the bottom end; and wherein the emitter is configured to emit the warning signal when the label holder is rotated away from the bottom end.

3. The signal-emitting retail display device of claim 2, wherein the emitter is configured to emit an audible alarm when the label holder is rotated away from the bottom end, and configured to transmit a warning signal to the signal box when the label holder is rotated away from the bottom end for longer than a threshold length of time.

4. The signal-emitting retail display device of claim 2, wherein the emitter is configured to emit an audible alarm and transmit a warning signal to the signal box when the label holder is rotated away from the bottom end for longer than a threshold length of time.

5. The signal-emitting retail display device of claim 2, wherein the emitter is configured to emit an audible alarm and transmit a warning signal to the signal box is rotated away from the bottom end more than a predetermined number of times within a threshold length of time.

6. The signal-emitting retail display device of claim 1, further comprising a U-shaped locking mechanism coupled to the electronic unit and configured to selectively rotate between an up position and a down position, wherein, in the down position, the U-shaped locking mechanism wraps around the bottom wire with the bottom wire passing through an aperture created by the U-shaped locking mechanism and the electronic unit, the U-shaped locking mechanism further configured to lock in the down position upon receipt of a signal by the electronic unit.

7. A retail theft deterrent system comprising:

a signal-emitting retail display device comprising:

a wire having a top portion configured to support a label holder; and an electronic unit that includes an emitter, the emitter being configured to transmit a wireless signal to an alarm box;

wherein the wire is electrically coupled to the electronic unit such that the wire functions as an antenna for the transmission of the wireless signal to the alarm box; and the alarm box comprising:

a receiver configured to receive a wireless signal from the signal-emitting retail display device;

an alarm box emitter configured to emit an audible signal in response to the wireless signal received from the signal-emitting retail display device; and one or more terminals for connecting the alarm box to an output receiving device.

8. The retail theft deterrent system of claim 7, wherein the alarm box further comprises control circuitry configured to transmit a control signal used to activate and/or control the output receiving device.

9. The retail theft deterrent system of claim 7, wherein the output receiving device is one of a computer, a pager, a cellular telephone, a public address system, computer memory, a video camera, and a video monitor.

10. The retail theft deterrent system of claim 7, wherein the alarm box further comprises control circuitry that causes the alarm box emitter to emit a first audible signal when a first wireless signal from the one or more signal-emitting retail display devices indicates no-theft condition, and to emit a second audible signal, different from the first audible signal, when a second wireless signal from the one or more signal-emitting retail display devices indicates a theft condition.

11. The retail theft deterrent system of claim 7, wherein the emitter is configured to either:

emit an audible alarm when the label holder is rotated away from the bottom end, and configured to transmit a warning signal to the signal box when the label holder is rotated away from the bottom end for longer than a threshold length of time; or emit the audible alarm and transmit a warning signal to the signal box when the label holder is rotated away from the bottom end for longer than a threshold length of time; or emit the audible alarm and transmit a warning signal to the signal box is rotated away from the bottom end more than a predetermined number of times within a threshold length of time.

12. The retail theft deterrent system of claim 7, wherein the alarm box further includes a mode switching button for switching the alarm box between different modes of operation, and wherein the signal-emitting retail display device includes a mode switch for switching the signal-emitting retail display device between different modes of operation.

13. The retail theft deterrent system of claim 7, wherein the top portion has a top end and the bottom portion has a bottom end, the top end and bottom end arranged in spaced relation to each other such that a label holder attached to the top end abuts the bottom end;

wherein the label holder is configured to rotate away from the bottom end; and wherein the emitter is configured to emit a warning signal when the label holder is rotated away from the bottom end.

14. The retail theft deterrent system of claim 7, wherein the signal-emitting retail display device comprises a U-shaped locking mechanism coupled to the electronic unit and configured to selectively rotate between an up position and a down position, wherein, in the down position, the U-shaped locking mechanism wraps around the bottom wire with the bottom wire passing through an aperture created by the U-shaped locking mechanism and the electronic unit, the U-shaped locking mechanism further configured to lock in the down position upon receipt of a signal by the electronic unit.

15. The retail theft deterrent system of claim 7, further comprising a second alarm box and a plurality of retail signal-emitting retail display devices, wherein the alarm box is paired with the signal emitting device having a first identification code, and the second alarm box is paired with a second signal emitting device having a second identification code.

* * * * *